US011222343B2

(12) United States Patent
Jana et al.

(10) Patent No.: US 11,222,343 B2
(45) Date of Patent: *Jan. 11, 2022

(54) METHOD AND APPARATUS FOR AUTONOMOUS SERVICES COMPOSITION

(71) Applicant: AT&T Intellectual Property I, L.P., Atlanta, GA (US)

(72) Inventors: Rittwik Jana, Montville, NJ (US); Thomas Kirk, Califon, NJ (US); Syed Anwar Aftab, Budd Lake, NJ (US); John F. Murray, Denville, NJ (US); Mazin E. Gilbert, Warren, NJ (US); Shu Shi, Summit, NJ (US); Serban Jora, Roanoke, VA (US); Avi Zahavi, Highland Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/038,050

(22) Filed: Sep. 30, 2020

(65) Prior Publication Data

US 2021/0012353 A1 Jan. 14, 2021

Related U.S. Application Data

(63) Continuation of application No. 16/736,982, filed on Jan. 8, 2020, now Pat. No. 10,846,709, which is a (Continued)

(51) Int. Cl.
*G06F 3/0481* (2013.01)
*G06Q 30/00* (2012.01)
(Continued)

(52) U.S. Cl.
CPC ....... *G06Q 30/016* (2013.01); *G06F 3/04817* (2013.01); *G06F 3/04845* (2013.01);
(Continued)

(58) Field of Classification Search
CPC G06Q 30/016; G06N 99/005; G06F 3/04845; G06F 3/04847; G06F 3/04817
See application file for complete search history.

(56) References Cited

U.S. PATENT DOCUMENTS 8,050,935 B2 11/2011 Plutowski et al.
10,698,569 B2 * 6/2020 Bugenhagen ........... H04L 67/34
(Continued)

FOREIGN PATENT DOCUMENTS

CN 101449242 A 6/2009
CN 103544623 A 1/2014
(Continued)

*Primary Examiner* — Anil K Bhargava
(74) *Attorney, Agent, or Firm* — Guntin & Gust, PLC; Ralph Trementozzi

(57) ABSTRACT

A cloud services composition system allows customers to interactively create service constructs from network function virtualization resources. The network function virtualization primitives are modeled using a standard modeling language. An expert system suggests network function virtualization resources for use in the service construct, based on an expert system learning algorithm. The customer uses a graphical user interface to interconnect the resources and create the service construct. The process may involve collaboration with the network provider. The resulting construct is validated for use in a communications network.

20 Claims, 5 Drawing Sheets

Related U.S. Application Data continuation of application No. 16/014,423, filed on Jun. 21, 2018, now Pat. No. 10,580,013, which is a continuation of application No. 15/043,521, filed on Feb. 13, 2016, now Pat. No. 10,037,536.

(51) Int. Cl.
| | | |
|---|---|---|
| *G06N 20/00* | (2019.01) | |
| *G06F 9/50* | (2006.01) | |
| *G06Q 10/10* | (2012.01) | |
| *G06F 3/0484* | (2013.01) | |

(52) U.S. Cl.
CPC ........ *G06F 3/04847* (2013.01); *G06F 9/5077* (2013.01); *G06N 20/00* (2019.01); *G06Q 10/10* (2013.01)

(56) References Cited

U.S. PATENT DOCUMENTS

| | | | |
|---|---|---|---|
| 2005/0096960 A1* | 5/2005 | Plutowski | G06Q 10/067 705/7.29 |
| 2008/0028365 A1* | 1/2008 | Erl | G06F 8/10 717/105 |
| 2014/0229945 A1 | 8/2014 | Barkai et al. | |
| 2014/0317261 A1 | 10/2014 | Shatzkamer et al. | |
| 2014/0362730 A1 | 12/2014 | Zhang et al. | |
| 2014/0365648 A1 | 12/2014 | Haraszti et al. | |
| 2015/0081856 A1* | 3/2015 | Rider | H04L 41/0803 709/220 |
| 2015/0124622 A1 | 5/2015 | Kovvali et al. | |
| 2015/0142940 A1 | 5/2015 | Mcmurry et al. | |
| 2015/0180730 A1 | 6/2015 | Felstaine et al. | |
| 2015/0256425 A1 | 9/2015 | Kikuchi et al. | |
| 2015/0263980 A1 | 9/2015 | Kasturi et al. | |
| 2015/0263987 A1* | 9/2015 | Klein | H04L 47/00 709/226 |
| 2015/0288622 A1* | 10/2015 | Fargano | H04L 41/5054 370/401 |
| 2015/0295781 A1* | 10/2015 | Maes | G06F 3/0482 715/735 |
| 2015/0326448 A1 | 11/2015 | Chaudhary et al. | |
| 2015/0326451 A1 | 11/2015 | Rao et al. | |
| 2015/0326535 A1* | 11/2015 | Rao | H04L 63/029 726/15 |

FOREIGN PATENT DOCUMENTS

| | | |
|---|---|---|
| CN | 104363159 A | 2/2015 |
| EP | 2041654 A4 | 9/2009 |
| JP | 2005182788 A | 7/2005 |
| JP | 2009164706 A | 7/2009 |
| JP | 2015162843 A | 9/2015 |
| JP | 2015166963 A | 9/2015 |
| WO | 2008011122 A2 | 1/2008 |
| WO | 2016022908 A1 | 2/2016 |

\* cited by examiner

METHOD AND APPARATUS FOR AUTONOMOUS SERVICES COMPOSITION

CROSS-REFERENCE TO RELATED APPLICATIONS

This application is a continuation of U.S. application Ser. No. 16/736,982, filed on Jan. 8, 2020, which is a continuation of U.S. application Ser. No. 16/014,423, filed on Jun. 21, 2018, issued on Mar. 3, 2020 as U.S. Pat. No. 10,580,013, which is a continuation of U.S. application Ser. No. 15/043,521, filed on Feb. 13, 2016 and issued on Jul. 31, 2018 as U.S. Pat. No. 10,037,536. All sections of the aforementioned application(s) and/or patent(s) are incorporated herein by reference in their entirety.

TECHNICAL FIELD

Embodiments of the present disclosure relate to the creation and deployment of services in a network containing network function virtualization infrastructure. Specifically, the disclosure relates to composition by the customer of network services from virtualized resources.

BACKGROUND

Cloud networks are becoming increasingly intelligent and programmable. The networks utilize intelligent software systems and applications operating on general-purpose commodity hardware. That transformation decreases capital and operating expenses, while permitting configuration of the networks with less human intervention. At the same time, significant opportunities are created to scale and monetize existing and new intelligent services.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1:
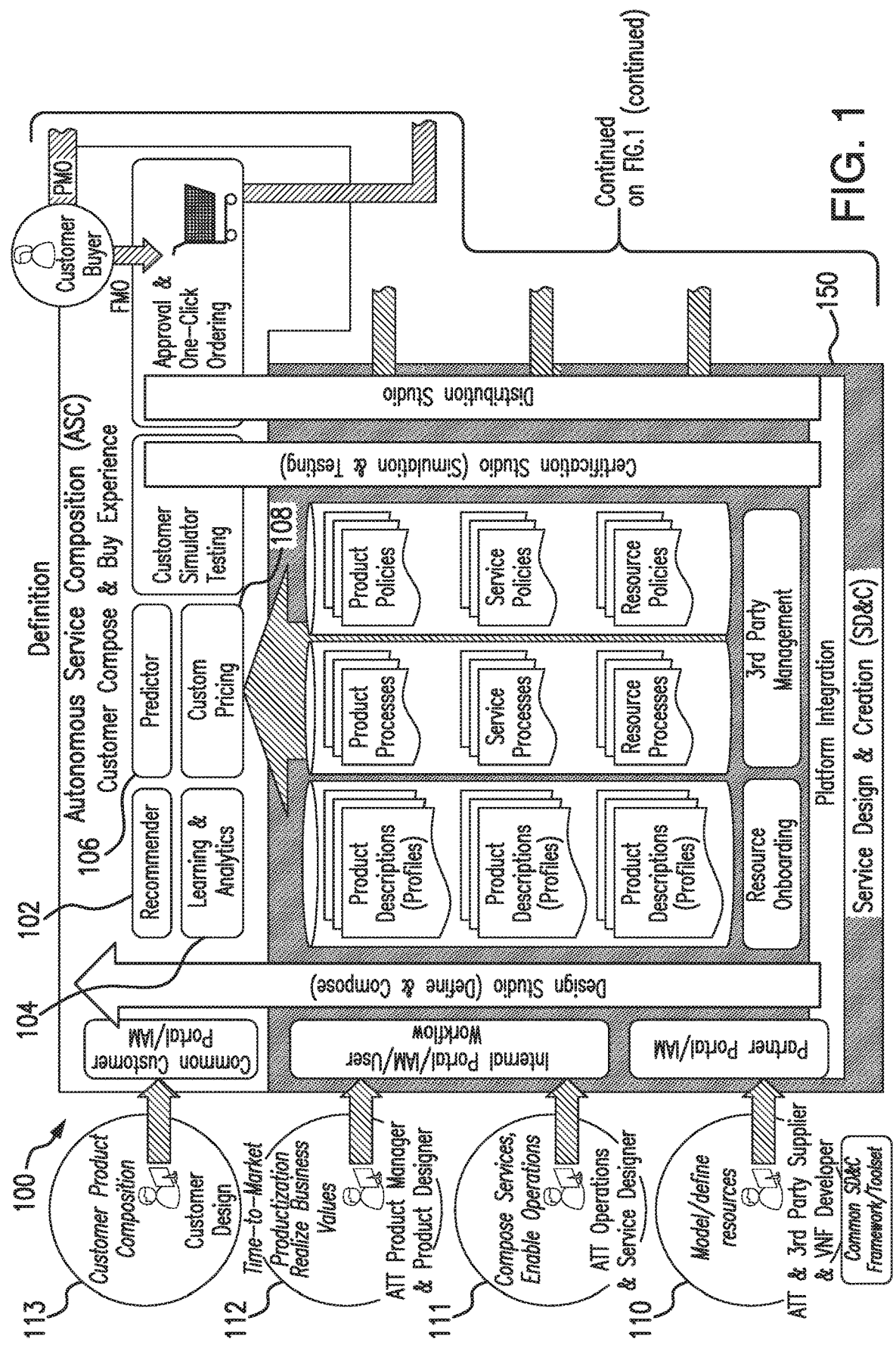
FIG. 1 is a block diagram showing a system for composing a network service.
Figure 1:
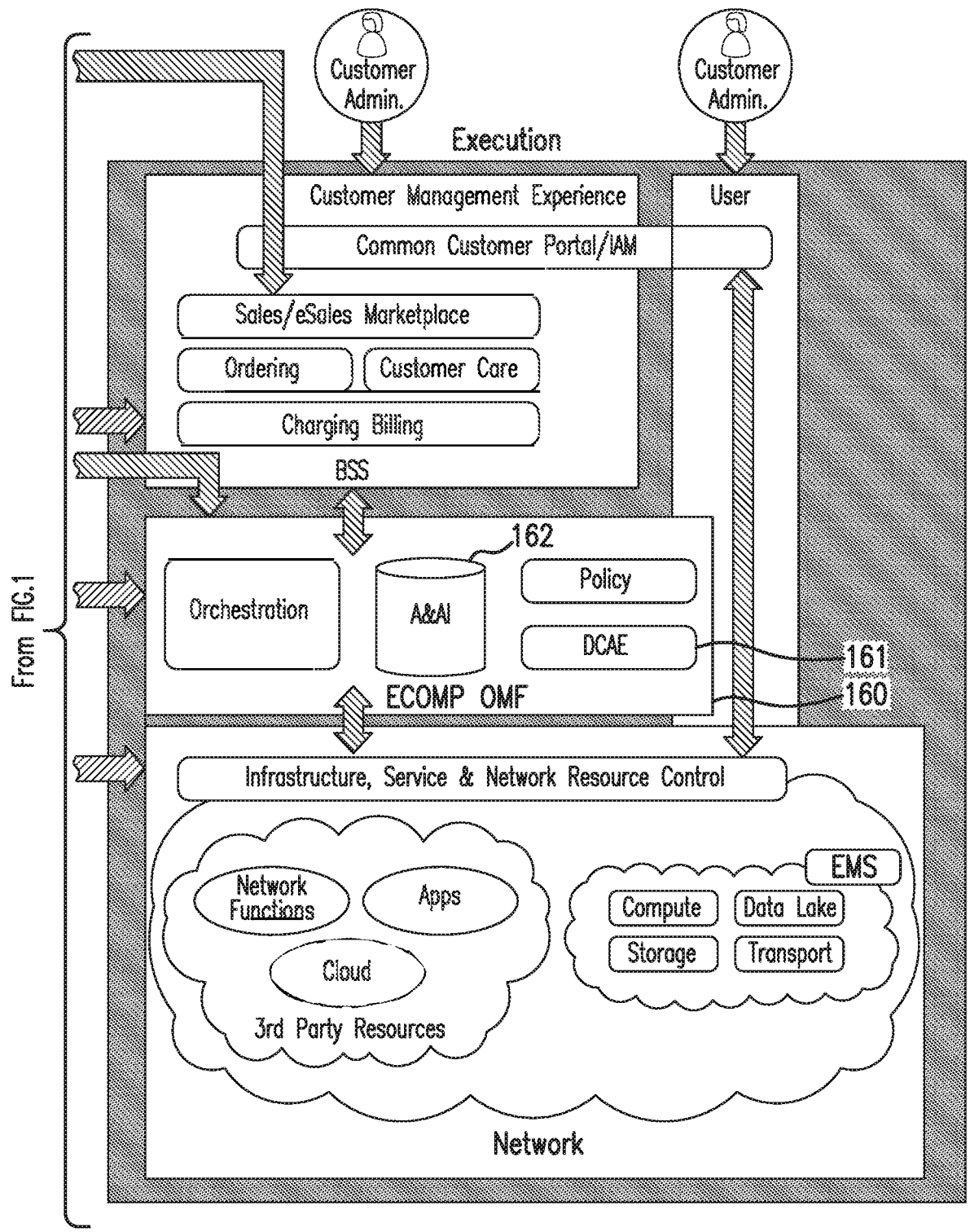

Web service composition is currently used to create a single Web application by utilizing a variety of different applications inside the single Web application. That is done by means of simple object access protocol (SOAP) APIs from each of the constituent applications. This ultimately has to do with service granularity—which indicates how much functionality a service exposes. A coarse-grained service will expose a whole process as a consumable unit, whereas a fine-grained service will expose a specific unit of logic from a larger process. Service architects determine what granularity of service works best for a given environment.

The presently described system enables cloud providers to establish a services ecosystem for facilitating mass marketing of existing and new network services. The system lowers barriers to entry for enterprise customers and small business customers to create new services.

In general, the disclosed intelligent service collects information about resources (users, devices, networks, and applications) used to deliver the service and information about the environment in which it operates. It then makes decisions based on that information and domain knowledge which includes adapting and personalizing the service for the users composing and consuming it. The intelligent service receives feedback on its performance and learns.

The services composition system achieves several important goals. It is a predictive personalized service in that it anticipates a user's needs and proactively takes intelligent actions and recommends valuable and timely personalized information. The system is additionally an adaptive system that learns from past actions of all users and adjusts its behavior to provide superior service quality. Finally, the services composition system is dynamic in that it is robust and is able to survive and self-repair or self-organize itself from possible service interruptions.

In certain embodiments of the present disclosure, a method is provided for composing a service in a communications network. A plurality of resource models is defined, each resource model describing a behavior of a virtualized network function resources in the communications network. A customer service creation request is received from a customer to create a new network service, the request including a functional description of the new network service. Based on an expert system learning algorithm trained using prior customer service creation requests, one or more of the virtualized network function resources are suggested to the customer for use in composing the new network service. An arrangement of icons is received from the customer via a graphical user interface. The arrangement of icons represents a subset of the virtualized network function resources and includes representations of interconnections among the virtualized network function resources. Based on the arrangement of icons and on the behaviors of the subset of the virtualized network function resources, the arrangement of icons is validated as representing a feasible service composition for deployment in the communications network. The service composition is deployed in the communications network for use by the customer.

In additional embodiments, a computer-readable storage device is provided having stored thereon computer readable instructions for composing a service in a communications network. Execution of the computer readable instructions by a processor causes the processor to perform operations including those described above.

In another embodiment, a system is provided for composing a service in a communications network. The system comprises a processor resource, an interface connecting the processor resource, and a computer-readable storage device having stored thereon computer readable instructions.

Execution of the computer readable instructions by the processor resource causes the processor resource to perform operations including those described above.

The presently disclosed autonomous services composition system 100 (FIG. 1) is an example of an intelligent service. The system 100 creates a 'services marketplace' that provides a holistic customer experience to create novel services by leveraging advanced tools like recommenders 102 and expert systems and predictors 106, real time customer care collaboration, custom pricing 108 and big data analytics 104. The service composition system includes a mechanism for integrating applications/services from predefined component modules or resources 110, linking those modules and deploying them where and when they are needed. It is that service linking capability that provides the basic mechanism for defining new applications, managing application lifecycles, and implementing elastic services in the composition environment. By rapidly integrating components and sizing those components dynamically, applications can be built to handle varying user loads. By selectively deploying component modules based upon affinity rules, multiple time-critical functions can be directed to share common infrastructure to minimize latency, while high availability can be maintained by directing redundant components to execute on geographically separated servers.

The presently described services marketplace allows customers, partners, developers, and others to interface and interact with each other and with a broad array of tools, including analytic engines, data, predictive and recommendation tools, collaboration. The interaction is highly flexible and easily configurable, allowing users to discover, create, simulate, deploy, monitor, and otherwise bring to realization service constructs assembled from service primitives. Those services can range from a straightforward service drawn without change directly and immediately from a catalog to unique and complex service creations resulting from the collaboration of customers, partners, developers, and others, and possibly spanning years of joint efforts.

A model driven approach is used at the heart of the services marketplace to facilitate the creation and management of dynamic service compositions. The approach entails separation of the fundamental composition logic from composition specifications. Because network services are increasingly provided using network function virtualized (NFV) resources, there is a need to model those resources appropriately to facilitate higher layer applications to provide value-added services, such as the disclosed composition environment.

As shown in FIG. 1, the presently disclosed autonomous services composition system utilizes models of resources 110, services 111 and products 113. Resources can be concatenated to build services. Services can be ordered together with business policies and pricing to form end products. Composition is facilitated by leveraging relationships between services and products to create a final product that entails features from its constituent services/products. Industry standards are used to model the NFVs. For example, embodiments utilize the OASIS Topology and Orchestration Specification for Cloud Applications (TOSCA) modelling specification.

A product 113 is composed from its constituent virtualized resources 110. A model is provided for describing each resource. Note that a network function virtualization can be modeled into a default set of features, with an optional set of alternative add-on features.

Figure 2:
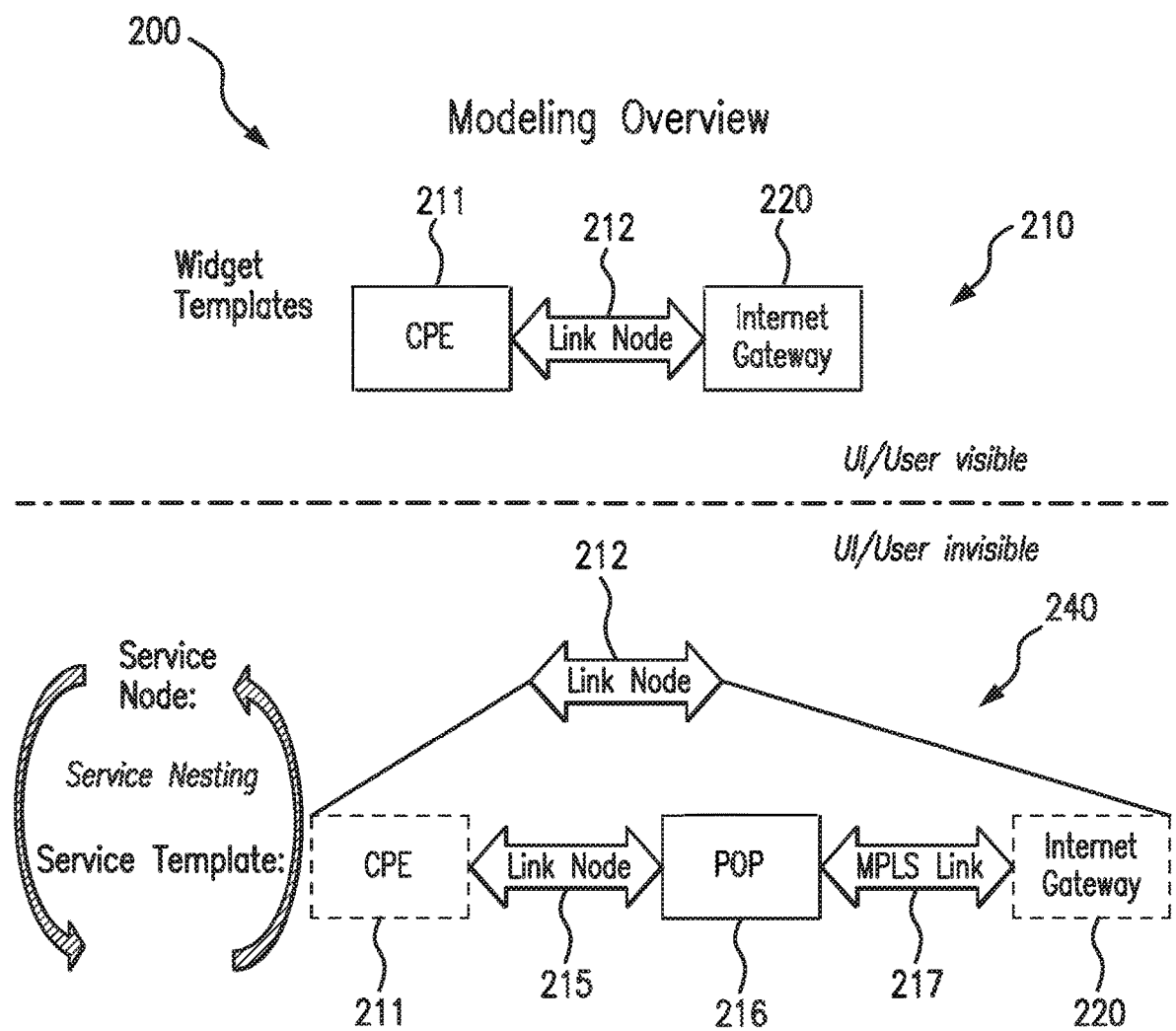
FIG. 2 is a block diagram showing two views of a composition example according to aspects of the present disclosure.

A composition example 200, shown in FIG. 2, demonstrates the composition of two products: a network-on-demand product and a managed Internet service product. The managed Internet service product provides Internet connectivity to enterprise customers. At the customer view 210, this is shown as a site office with a customer premises equipment (CPE) 211 connected by a link node 212 to an Internet gateway 220. Drilling down one more level shows a services view 240 including the various possibilities that the customer or network provider operations personnel can see. The link node 212 is further described in terms of an access link, namely the CPE 211 to a point of presence (POP) link 216 via a link node 215, and from the POP 216 to an Internet gateway 220 via a multiprotocol label switching (MPLS) link 217. The access links can come in many varieties, one of which is defined as network-on-demand using virtualized routers. Each of those entities must be modeled in a generic way to allow different levels of service granularity. For example, the CPE has certain characteristics like bandwidth, number of ports, grade of service, etc.

The disclosed services composition system utilizes an ecosystem populated with an array of NFV models that facilitate interlinking or combining to provide a richer set of value-added services. Combining products and services in unique ways that have not been thought of provides opportunities that can be monetized and meet customer needs more holistically. An additional benefit of this is that the process can be self-propelled where vendors and partners are incented to contribute various NFV models using well known standards, such as the OASIS TOSCA modelling language.

Figure 3:
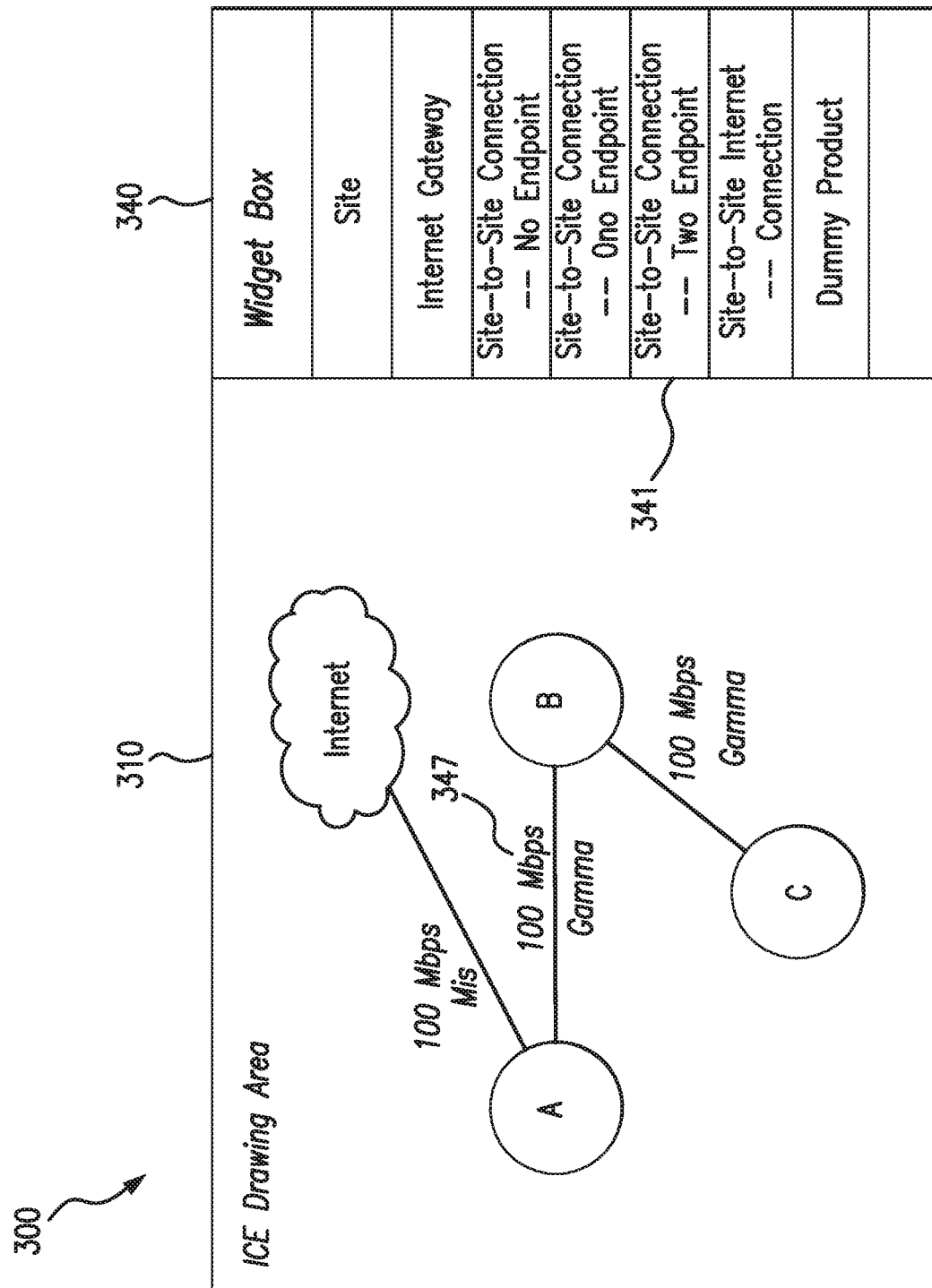
FIG. 3 is a screen view of a graphical user interface for composing a service according to aspects of the present disclosure.

An exemplary graphical user interface 300 for accessing such an ecosystem is shown in FIG. 3. In a widget box 340, the user is provided with models of VNFs that may be selected for representation in a drawing area 310. Upon selection of a particular widget, the user specifies characteristics that are then implemented in the model. For example, a widget 341 representing a site-to-site connection with two end points may be selected. The user specifies characteristics for the connection, including a 100 Mbps bandwidth and endpoints A and B. A representation 342 of the connection is then created in the drawing area.

The composed service represented in the drawing area 310 may be simulated and tested using the underlying models of the selected VNFs and the specified interconnections. The simulation and testing may be performed either in real time during composition or in response to a discrete request by the customer.

In another example use case of the described composition system, a set of basic services is requested by a customer: a) data connectivity between two endpoints (e.g. a switched Ethernet service), b) a data 'splitter' service that takes data from an endpoint and sends it to two or more endpoints, c) a video anomaly detection service that takes a video stream and sends alarms to an endpoint, and d) a data archiving service. In this example, a small-town bank with a video surveillance camera in the lobby wants to send that video stream to a home office while away from the bank. In the presently disclosed composition environment, the basic connectivity service is configured with the endpoint locations. The customer requires that alerts additionally be sent when something unexpected happens. In the example, that feature can be composed by taking the video output from the data splitter service and piping it into the anomaly detection service. The anomaly detection service is configured to send alerts out. There may also be a need to store the video for six months, in addition receiving the alerts. In each of those cases, the composition environment creates the individual service orders for the basic services and creates the overall application control that shows how the basic services are stitched together.

The disclosed composition environment uses items from the resource catalog 110, service catalog 111 and product catalog 113, shown in FIG. 1. Each of those network function virtualization (NFV) elements must be modeled before composition can be realized. That modeling may be done by the network provider, by a virtual network function developer or by a third-party supplier. In embodiments, an extended version of the TOSCA modeling language is used to model those products. The use of that open source modeling language facilitates rapid service composition in a manner that is verifiable at different stages of the software lifecycle.

The starting point of composition may be a catalog of third party NFVs. In embodiments, an ecosystem is created by the network provider for bootstrapping network provider vendors to populate the resource and service catalogs using TOSCA.

The architectural approach adopted for the presently disclosed composition environment enables rapid iterative development, an elastic scaling path as utilization grows, and flexibility in terms of evolving requirements and addition of new functionality. The subsystems are designed around a microservice architecture, in which components interoperate via a lightweight distributed message bus. In embodiments, Vert.x1M, an open source tool-kit for building reactive applications on the Java® virtual machine platform, is used. The carefully abstracted messaging publish/subscribe interface facilitates extensibility. For example, semantic assistants may be added from the intelligent toolbox. Finally, the cloud-based composition environment cluster can easily scale horizontally to meet elastic demand; subsystem replicas can be deployed in seconds on lightweight containers as utilization requires.

Composition is ultimately a complex data-driven process, using not only an extensive product catalog and asset inventory, but also representations of the domain expertise that goes into building complex composite services. Embodiments of the presently disclosed composition environment use graph database technology to allow natural ways to represent the semantic connections among catalog and inventory items, workflow state, and related domain knowledge. The database is dynamically extensible to accommodate learning throughout the lifecycle and is continuously available to intelligent agents overseeing and augmenting the composition process.

The disclosed composition environment must execute the composed order in a NFV environment such as AT&T's Domain 2.0 network environment. A 'shopping cart' like experience is created, allowing the end customer to discover, create, deploy, and watch the service. The composition environment must interoperate with a service design and creation (SD&C) subsystem 150 to fulfil the order. The composition environment also communicates with a range of entities in the NFV environment to monitor the service and present real-time reports in a dashboard using analytics and visualization tools. For example, the composition environment may communicate with various components of an enhanced, control, orchestration, management, policy (ECOMP1M) system 160, an AT&T system, including the data collection, analytics, and event (DCAE) engine 161 and active & available inventory (A&AI) subsystem 162 for real-time asset information.

A natural part of the composition process is to allow the customer to discover services and products that are related. An expert system is needed to suggest or recommend compatible products to guide successful compositions. Another key feature of the disclosed composition environment is designing for collaboration; given that composition is a complex activity often involving many participants, the composition environment has been designed to be a collaborative workspace from the start. Specifically, a customer may interact with the network provider personnel or third-party equipment provider personnel in real time during the composition process, using an interface provided for that purpose. That collaborative arrangement provides for network provider input and other vendor input during the composition process.

An additional aspect of composition of NFV services is the complexity and richness of the workflow. The disclosed composition environment seeks to provide seamless support of the entire composition lifecycle. To make the environment maximally accessible, the user interface is entirely browser-based, leveraging HTML5 technologies like WebGL and WebRTC to enable a powerful and effective user experience. Finally, a Web RTC-based collaboration environment has been provided for customer care needs.

The border between applications and network functions is becoming blurred in many cases. There are simple VNFs like vRouters (Vyatta® from Brocade Communications Systems Inc. and CRS® from Cisco Systems Inc., for example). Beyond that, there are domain name system (DNS) services, lightweight directory access protocol (LDAP) services and a like services which are more application-oriented services. New records must be added when a new tenant is provisioned, which is an application action.

More complex VNFs come with their own databases or rely on an open source relational or non-relational (noSQL) database like Cassandra™ for example. The complex VNFs or chains of VNFs like a CDN subsystem or IMS and EPC subsystems require deep orchestration capabilities, creation orders, network dependencies, relationships, and complex actions to be performed.

Autonomous service composition can be facilitated at various layers of the OSI stack. In the examples set forth in the present disclosure, it is used to improve the overall end customer experience by addressing from very simple scenarios to complex VFN chaining.

Figure 4:
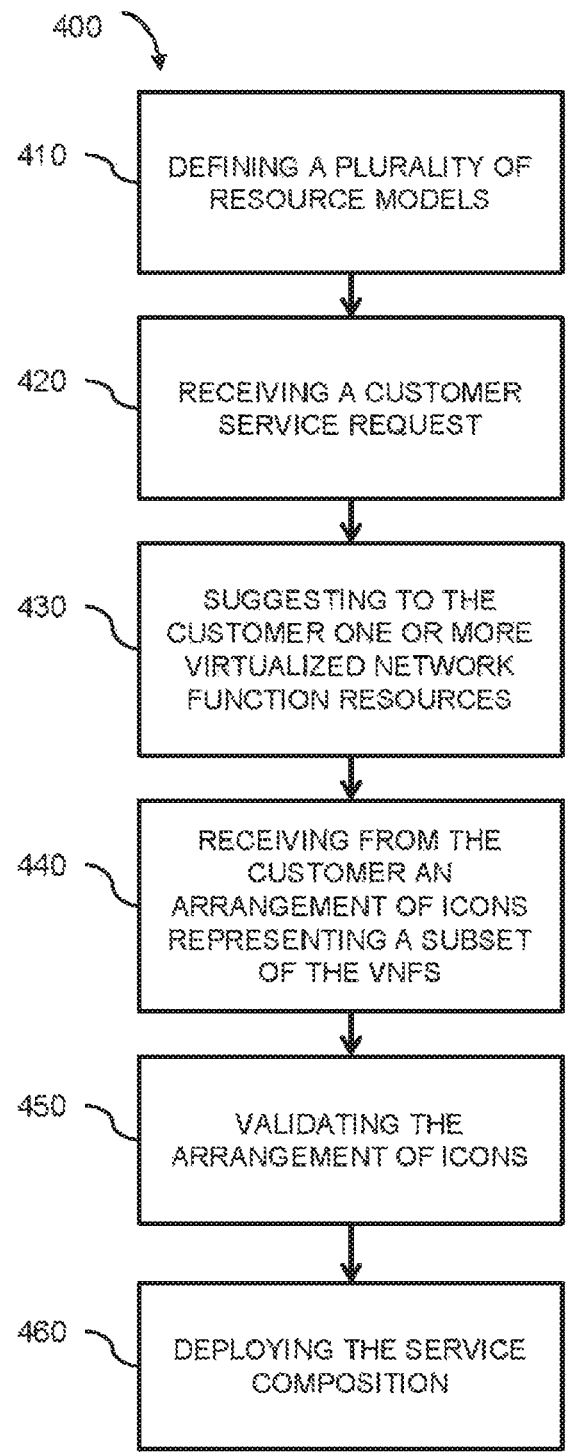
FIG. 4 is a flow chart showing a method according to aspects of the present disclosure.

An example method 400 for composing a service in a communication system is depicted by the flow chart of FIG. 4. A plurality of resource models is initially defined at block 410. Each resource model describes a behavior of a virtualized network function resource in the communications network. The resource models may, for example, be created by network provider vendors and partners, who may have an interest in the service composing system. The models may be created using well known standards such as the TOSCA modelling language.

A customer service creation request to create a new network service is received from a customer at block 420. The request includes a functional description of the new network service. In embodiments, the request may specify the relevant nodes, the types of connections, and the functions to be performed.

The system then suggests to the customer, at block 430, one or more of the modeled virtualized network function resources for use in composing the new network service. The suggestion is based on an analysis of the functional description the new network service by an expert system learning algorithm that has been trained using prior customer service creation requests.

The customer then defines an arrangement of icons representing a subset of the virtualized network function resources, which is received from the customer via a graphical user interface at block 440. The arrangement of icons includes representations of interconnections among the virtualized network function resources. The customer may use the graphical user interface to graphically define the interconnections. The service composition system may assist the customer in arranging the icons using expert system learning algorithm.

Based on the arrangement of icons and on the behaviors of the subset of the virtualized network function resources, the arrangement of icons is validated at block 450 as representing a feasible service composition for deployment in the communications network. The service composition is then deployed at block 460 in the communications network for use by the customer.

The hardware and the various network elements discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random-access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method, comprising:

employing, by a processing system including a processor, a learning algorithm to perform an analysis of a functional description of a requested network service, the learning algorithm being trained using prior customer service creation requests, the learning algorithm using a plurality of resource models that describe behaviors of virtualized network function resources of a communications network;

providing, by the processing system and for presentation via user equipment, a composition environment comprising icons representing a suggested subset of the virtualized network function resources for use in composing the requested network service, the suggested subset being based on the analysis of the functional description of the requested network service;

providing, by the processing system, assistance in defining an arrangement of the icons in the composition environment including interconnections among the icons, the assistance provided according to the learning algorithm; and overseeing, by the processing system, validation of the arrangement of the icons obtained from the composition environment as representing a feasible service composition for deployment in the communications network, the feasible service composition adapted for deployment in the communications network.

2. The method of claim 1, further comprising:

obtaining, by the processing system, real-time asset information regarding the feasible service composition from a virtual network function management framework, the virtual network function management framework including a data collection, analytics and event engine and an active and available inventory subsystem; and providing, by the processing system, real time reports of the deployed feasible service composition in a dashboard of the composition environment using analytics and visualization tools.

3. The method of claim 1, wherein the plurality of resource models includes models that describe network requirements of the virtualized network function resources, exposed properties of the virtualized network function resources and interconnection relationships of the virtualized network function resources with other virtualized network function resources.

4. The method of claim 1, wherein the resource models are defined using a Topology and Orchestration Specification for Cloud Applications open cloud standard modeling language.

5. The method of claim 1, wherein the validation of the arrangement of the icons as representing a feasible service composition for deployment in the communications network further comprises simulating, by the processing system, the requested network service using the resource models.

6. The method of claim 1, wherein the validation of the arrangement of the icons as representing a feasible service composition for deployment in the communications network further comprises determining, by the processing system, whether the communications network contains Layer 1 resources where required by the requested network service.

7. The method of claim 1, wherein the suggested subset of the virtualized network function resources for use in composing the requested network service is further based on a domain of the user equipment.

8. The method of claim 1, wherein deploying the feasible service composition further comprises:
receiving, by the processing system, an order from the user equipment for the requested network service; and
in response to the receiving the order, orchestrating, by the processing system, the requested network service including resource management, metering, and billing management.

9. A device, comprising:
a processing system including a processor;
a memory that stores executable instructions that, when executed by the processing system, facilitate performance of operations, the operations comprising:
employing a learning algorithm to perform an analysis of a functional description of a requested network service, the learning algorithm being trained using prior customer service creation requests, the learning algorithm using a plurality of resource models that describe behaviors of virtualized network function resources of a communications network;
providing for presentation via user equipment, a composition environment comprising icons representing a suggested subset of the virtualized network function resources for use in composing the requested network service, the suggested subset being based on the analysis of the functional description of the requested network service;
providing assistance in defining an arrangement of the icons in the composition environment including interconnections among the icons, the assistance provided according to the learning algorithm; and
overseeing validation of the arrangement of the icons obtained from the composition environment as representing a feasible service composition for deployment in the communications network.

10. The device of claim 9, wherein the operations further comprise:
deploying the feasible service composition in the communications network;
obtaining real-time asset information regarding the feasible service composition from a virtual network function management framework, the virtual network function management framework including a data collection, analytics and event engine and an active and available inventory subsystem; and
providing real time reports of the deployed feasible service composition in a dashboard of the composition environment using analytics and visualization tools.

11. The device of claim 9, wherein the plurality of resource models further includes models that describe network requirements of the virtualized network function resources, exposed properties of the virtualized network function resources and interconnection relationships of the virtualized network function resources with other virtualized network function resources.

12. The device of claim 9, wherein the resource models are further defined using a Topology and Orchestration Specification for Cloud Applications open cloud standard modeling language.

13. The device of claim 9, wherein the validation of the arrangement of the icons as representing a feasible service composition for deployment in the communications network further comprises simulating the requested network service using the resource models.

14. The device of claim 9, wherein the validation of the arrangement of the icons as representing a feasible service composition for deployment in the communications network further comprises determining whether the communications network contains Layer 1 resources where required by the requested network service.

15. The device of claim 9, wherein the suggested subset of the virtualized network function resources for use in composing the requested network service is further based on a domain of the user equipment.

16. A non-transitory computer-readable storage medium comprising executable instructions that, when executed by a processing system including a processor facilitate performance of operations, the operations comprising:
employing a learning algorithm to perform an analysis of a functional description of a requested network service, the learning algorithm being trained using prior customer service creation requests, the learning algorithm using a plurality of resource models that describe behaviors of virtualized network function resources of a communications network;
providing for presentation via user equipment, a composition environment comprising icons representing a suggested subset of the virtualized network function resources for use in composing the requested network service, the suggested subset being based on the analysis of the functional description of the requested network service;
providing assistance in defining an arrangement of the icons in the composition environment including interconnections among the icons, the assistance provided according to the learning algorithm; and
overseeing validation of the arrangement of the icons obtained from the composition environment as representing a feasible service composition for deployment in the communications network, the feasible service composition adapted for deployment in the communications network.

17. The non-transitory computer-readable storage medium of claim 16, wherein the operations further comprise:
obtaining real-time asset information regarding the feasible service composition from a virtual network function management framework, the virtual network function management framework including a data collection, analytics and event engine and an active and available inventory subsystem; and providing for presentation real time reports of the deployed feasible service composition in a dashboard of the composition environment using analytics and visualization tools.

18. The non-transitory computer-readable storage medium of claim 16, wherein the plurality of resource models includes models that describe network requirements of the virtualized network function resources, exposed properties of the virtualized network function resources and interconnection relationships of the virtualized network function resources with other virtualized network function resources.

19. The non-transitory computer-readable storage medium of claim 16, wherein the validation of the arrangement of the icons as representing a feasible service composition for deployment in the communications network further comprises simulating the requested network service using the resource models.

20. The non-transitory computer-readable storage medium of claim 16, wherein the resource models are defined using a topology and orchestration specification for cloud applications open cloud standard modeling language.

\* \* \* \* \*